H. C. BULL.
Adjusting Apparatus for Cut-Off Valves.
No. 159,071. Patented Jan. 26, 1875.
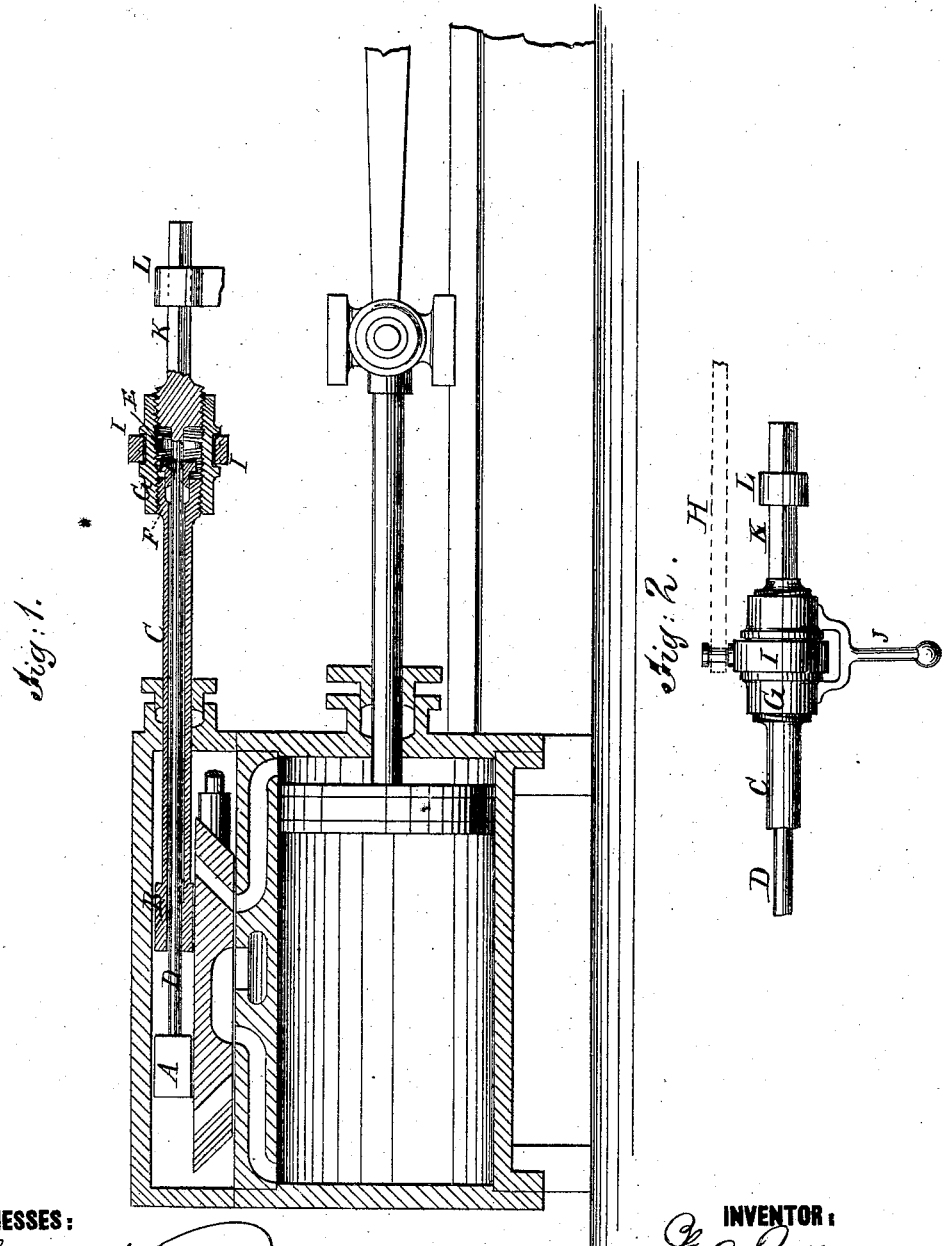

UNITED STATES PATENT OFFICE.

HENRY C. BULL, OF NEW YORK, N. Y., ASSIGNOR TO HIMSELF AND M. A. SOUTHWORTH, OF NEW ORLEANS, LOUISIANA.

IMPROVEMENT IN ADJUSTING APPARATUS FOR CUT-OFF VALVES.

Specification forming part of Letters Patent No. 159,071, dated January 26, 1875; application filed July 11, 1874.

*To all whom it may concern:*

Be it known that I, HENRY C. BULL, of New York, in the county of New York and State of New York, have invented a new and Improved Adjusting Apparatus for Cut-Off Valves, of which the following is a specification:

My invention consists of two cut-off valves, one for each port of the slide-valve, having independent rods extending out through the steam-chest, one within another, and connected with an adjusting-nut, one by a right-hand, and the other by a left-hand, screw, so that the sleeve which is swiveled to the eccentric-ro l, being turned right or left, will shift the valves toward or from each other simultaneously and alike.

The essential object of contriving the adjusting device outside of the steam-chest is to enable the screws to be made so large that sufficient movement of the valves may be obtained by a quarter-turn of the adjusting-nut, which is provided with a handle on one side for the purpose.

Figure 1 is a sectional elevation of an engine with my improved cut-off-valve adjusting apparatus. Fig. 2 is a side elevation of the adjusting-nut, showing the manner of swiveling it to the eccentric.

Similar letters of reference indicate corresponding parts.

A and B represent the two valves. C represents the stem of B. It is hollow, and the stem D of valve A passes through it, and extends a little beyond, out of a stuffing-box, E, in the end of stem C, to prevent steam from leaking. Both stems have an enlargement, F, on the end, one of which has a right-hand thread, and the other a left-hand one, and they screw in a right and left hand threaded adjusting-nut, G, which is swiveled to the eccentric-rod H by a sleeve, I, or, it may be by any other suitable means, so that the nut may be turned forward and backward half a turn, more or less, by a handle, J, which is connected to it for the purpose, thus affording a means of shifting the valves merely by the turning of the nut.

By this arrangement the nut and the screw-heads F may be made large to obtain any required throw of the valves by a given amount of turns of the nut, say, a quarter, which will be the most convenient.

As it is desirable to have the rods C D screw into the valves, the head of rod D may have an extension, K, working in a box, L, to prevent it from working around; and rod C may have stud-pins or guides of any kind for the same purpose.

Having thus described my invention, what I claim as new, and desire to secure by Letters Patent, is—

1. The combination of the cut-off valves A B within the steam-chest, connecting-rods C D, having threaded heads, right and left threaded adjusting-nut G, the swiveled sleeve, and the eccentric, substantially as shown and described, to operate as specified.

2. The combination of valve-rod D, tubular valve-rod C, stuffing-box E, and sleeve G, substantially as shown and described.

HENRY C. BULL.

Witnesses:
T. B. MOSHER,
ALEX. F. ROBERTS.